US008125343B2

(12) United States Patent
Denale

(10) Patent No.: US 8,125,343 B2
(45) Date of Patent: Feb. 28, 2012

(54) SYSTEM FOR CHILD SAFETY

(75) Inventor: Karen Denale, Bluemont, VA (US)

(73) Assignee: Karen Marie Denale Trust, dated September 16, 2011, Bluemont, VA (US)

( * ) Notice: Subject to any disclaimer, the term of this patent is extended or adjusted under 35 U.S.C. 154(b) by 329 days.

(21) Appl. No.: 12/426,026

(22) Filed: Apr. 17, 2009

(65) Prior Publication Data

US 2010/0265055 A1 Oct. 21, 2010

(51) Int. Cl.
*G08B 23/00* (2006.01)
(52) U.S. Cl. .................. 340/573.1; 340/457; 340/457.1; 340/687
(58) Field of Classification Search .................. 340/457, 340/457.1, 457.2, 687, 667, 573.1, 573.4, 340/425.5, 522; 180/273; 701/1, 45–49; 280/734, 735
See application file for complete search history.

(56) References Cited

U.S. PATENT DOCUMENTS

| 6,870,472 | B2 | 3/2005 | Gift et al. |
| 6,909,365 | B2 | 6/2005 | Toles |
| 6,924,742 | B2 * | 8/2005 | Mesina ...................... 340/573.1 |
| 7,123,157 | B2 | 10/2006 | Best |
| 7,230,530 | B1 | 6/2007 | Almquist et al. |
| 7,321,306 | B2 * | 1/2008 | Lee et al. ................... 340/572.1 |
| 7,378,979 | B2 * | 5/2008 | Rams, Jr. ..................... 340/667 |

* cited by examiner

*Primary Examiner* — Anh V La
(74) *Attorney, Agent, or Firm* — Michael L. Greenberg, Esq.; Greenberg & Lieberman, LLC

(57) ABSTRACT

A system for child safety relating to a child safety seat that is in communication with the internal wiring or computer system of a vehicle such that when the vehicle ignition is turned off and the child safety seat is engaged, an audible alert is emitted through the vehicle speakers.

3 Claims, 4 Drawing Sheets

SYSTEM FOR CHILD SAFETY

FIELD OF THE PRESENT INVENTION

The present invention relates to a child safety system that integrates a child safety seat connection into the wiring of a vehicle such that an audible and visual alert is triggered when the vehicle ignition is in the "off" position while the child safety seat is engaged.

BACKGROUND OF THE PRESENT INVENTION

Child safety is paramount to most parents and guardians. This is especially true when it comes to vehicle safety. In fact, numerous laws relate to child safety in vehicles. Perhaps the most notable are laws requiring child safety seats to be installed and used for small children. But a problem has developed where otherwise mindful and responsible parents become distracted and ultimately leave their child restrained unattended in a child safety seat of a vehicle. As such, there is a need for an alert mechanism that is seamless to employ and integrated into the internal wiring or computer system of the vehicle.

According to statistics, 15 to 25 children in the United States suffer from "death by hyperthermia" upon being left unattended in a vehicle child safety seat. Thousands of other children have been saved before succumbing when accidentally being left in a child safety seat. This period of time can be relatively short number of minutes to many hours. Studies have shown that most parents involved in such issues are in fact responsible and attentive parents who on that particular day are upset, busy, or otherwise confused or distracted by events that end up changing the normal course of a schedule. This problem was exacerbated by a trend toward mandatory child safety seats beginning in the early 1990s after passenger-side airbags were deemed dangerous to children. Studies describe such parents as mothers and fathers of all races and ethnicities, rich and poor, professional and working class. In 2008, this phenomenon even occurred three times in one day. Despite the guilt and grief associated with such incidents, parents also have been prosecuted. The point is that "death by hyperthermia" is a very real danger that needs a simple and seamless system to help prevent such incidents.

Many cases relating to such incidents do not necessarily occur in the heat of summer. Children restrained in vehicles have succumbed to hyperthermia in many types of weather, to include 60 degrees F. As such, there is a need for a system that offers an automatic alert for situations where the vehicle ignition is turned off and a child safety seat is engaged. In this manner, the system is not overly prominent but rather a regular feature associated with the child safety seat and associated vehicle. In that way, a parent or guardian would only confront the system when the child safety seat is engaged and the ignition is turned off. This is particularly true with an internal and automatic system check relating to the physical components. The present invention solves this need by placing a child safety seat connection into the child safety seat. A wired or wireless conduit connects the child safety seat to the vehicle in such a way that when the ignition is turned off and the child safety seat is engaged, an alert will be emitted through the vehicle speakers. A flashing light on the dashboard, which also can be linked with an existing alert such as no-seatbelt alert, also is envisioned.

The need for the present invention is compounded by the fact that there is not a seamless alert system that can solve the problems associated with the issue of accidentally leaving a child in a car safety seat and the potential for "death by hyperthermia."

U.S. Pat. No. 7,123,157 issued to Best on Oct. 17, 2006 is a car-seat occupied baby-on-board indicator alarm. Best places a weight sensor on the driver's seat so that when a driver rises from the seat, an alarm will sound. Unlike the present invention, Best requires a special audio alert apparatus and focuses on the driver. In contrast, the present invention integrates the child safety seat directly with the vehicle's sound system in a manner that actual ignition status opens and closes the circuit pertaining to the engagement of the child safety seat. Additional pressure sensing items that also require additional external components and therefore are substantially different from the present invention include U.S. Pat. No. 7,218,218 issued to Rogers on May 15, 2007 and also U.S. Pat. No. 7,140,401 issued to Cole on Jan. 30, 2007.

Other items out there, to include U.S. Pat. No. 7,230,530 issued to Almquist on Jun. 12, 2007 also require additional housing and external audio systems and again do not operate through the ignition status or include the safety check of the present invention. Meanwhile, U.S. Pat. No. 6,870,472 issued to Gift et al on Mar. 22, 2005 integrates motion detecting technology to detect when a child has been left in a vehicle. This, as in the other examples, is vastly different from the present invention, which issues an alert through the vehicle speaker system when the child safety seat is engaged and the ignition is turned off.

U.S. Pat. No. 6,909,365 issued to Toles on Jun. 21, 2005 is a child safety alarm seat and method. Toles issues an alarm for when a child is in a safety seat after the ignition is turned off. Unlike the present invention, Toles is not integrated into the audio system of the vehicle. Toles also requires an actual switch to be turned on and off upon placing a child in a safety seat. Moreover, Toles requires constant power source and more external items to function. The present invention becomes operational through engagement of the child safety seat and does not require that the caregiver actually use a switch. In addition, the present invention is integrated with non-essential outlets, non-essential fuses and/or the vehicle computer system in such a manner that when the ignition is turned off, the internal vehicle makeup will divert a connected signal to the audio system of the vehicle, to include a stereo system, so that the alert is emitted through the existing audio system. In addition, the present invention also provides a system check and diagnostic to ensure that all circuits are functioning properly.

There remains a need for a system of child safety that integrates a child safety seat with the internal wiring and/or computer system of the vehicle. The present invention differs from all other items in this field because it recognizes that a distracted driver may also forget to actually flip a switch or take care to ensure fuses and other components are operating properly. As such, the present invention incorporates a system check and integrates part of the alert process with the existing audio system of the vehicle.

SUMMARY OF THE PRESENT INVENTION

The present invention is a system for child safety. More specifically, the present invention integrates a child safety seat into the internal wiring of a vehicle. The child safety seat will be engaged or otherwise turned on when a child is secured into the child safety seat. Wiring will connect the vehicle to the child safety seat connection in the preferred embodiment. It also is envisioned that a circuit can be effectively closed upon engagement of the child safety seat via a conduit between the child safety seat connection and a non-critical fuse, or even a conventional remote signal that is emitted upon engagement. In all of these embodiments, the alert occurs when the child safety seat is engaged and the ignition is off. In the preferred embodiment, the alert will be an audible sound coming from the speakers associated with the vehicle audio system.

The child safety seat can be either installed into the vehicle or one capable of being inserted and removed from the vehicle. However, the child seat will have the child safety seat connection so that the child safety seat can be in communication with the vehicle via the vehicle's internal wiring and fuse component.

DETAILED DESCRIPTION OF THE PREFERRED EMBODIMENT

Figure 1:
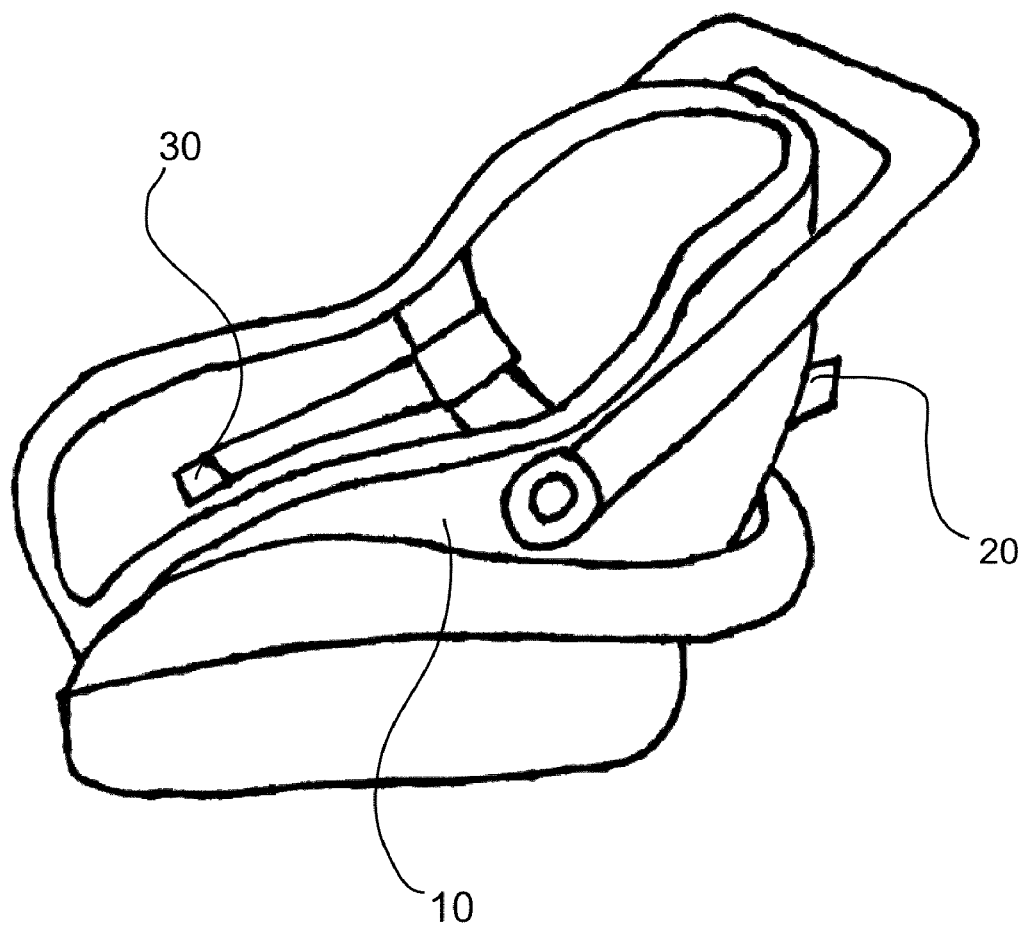
FIG. 1 is a view of an embodiment of a child safety seat of the present invention.
Figure 4:
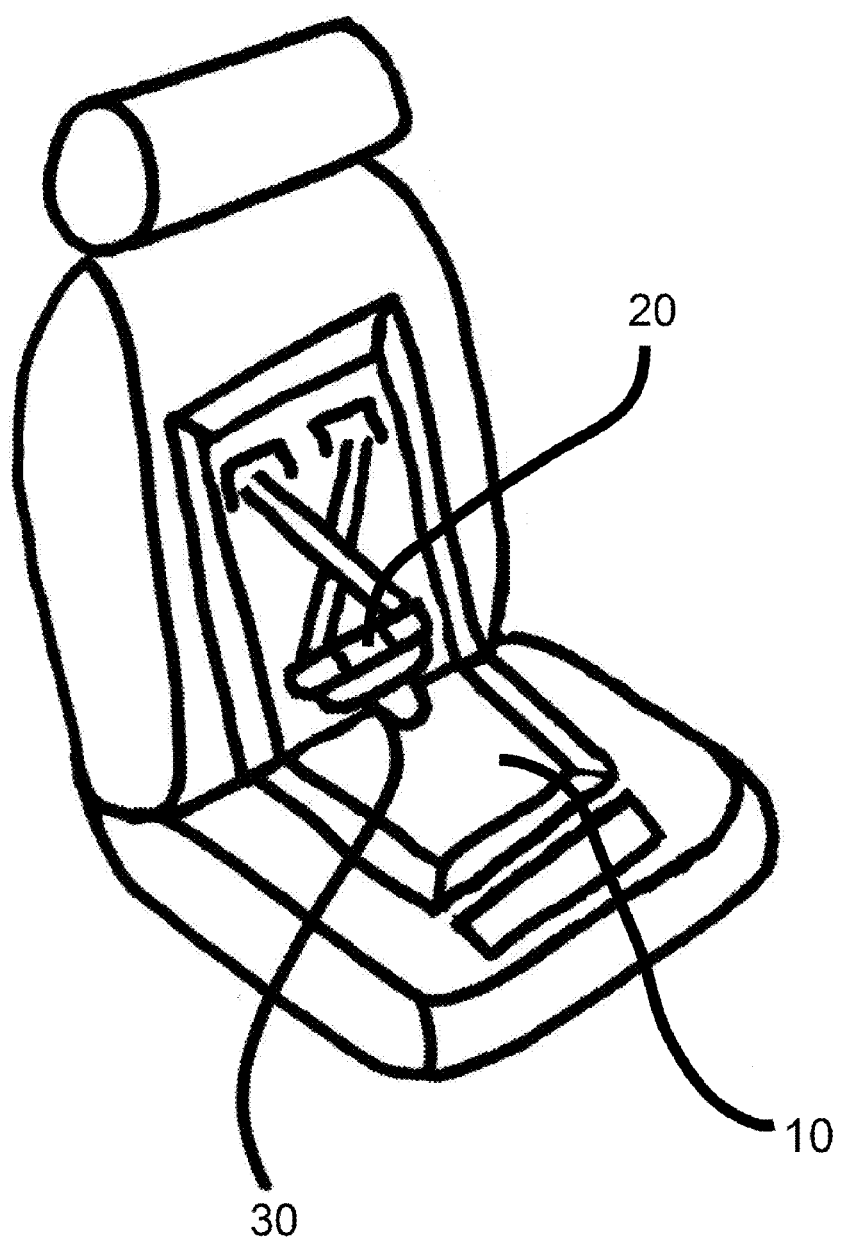
FIG. 4 is a view of an additional embodiment of a child safety seat of the present invention.

The present invention relates to a child safety seat (10) that communicates with the vehicle via conventional means. The child safety seat (10) also is conventional and is of such dimensions and harnessing that it can be either installed or removed and placed into the vehicle seating. A child safety seat connection (20) is incorporated into the child safety seat (10). FIG. 1 displays one embodiment of the placement of the child safety seat connection (20). It should be noted that the child safety seat connection (20) can be formed or otherwise located on the child safety seat (10) at its harness, latch, bar or other securing element as well as in virtually any other position. In addition, FIG. 4 is an additional embodiment of the child safety seat (10) where it is built in directly to the vehicle as a fold-out child safety seat (10) or otherwise installed into the vehicle interior on a more established basis than a typical portable child safety seat (10).

The child safety seat connection (20) in the preferred embodiment serves as the entry point for a conduit to carry power and information from a vehicle to the child safety seat (10). In one embodiment, the child safety seat connection (20) is such that the conduit is connected to the child safety seat connection (20) and leads to the vehicle computer system. The child safety seat connection (20) can be included with the engagement mechanism (30) or placed at any location on the child safety seat (10) regardless of it being a portable one such as seen in FIG. 1 or one manufactured with the vehicle as seen in FIG. 4. In an additional embodiment, the child safety seat connection (20) is such that the conduit leads to a non-critical plug or outlet such as a mobile phone adapter outlet, external media player outlet or cigarette lighter plug. In an additional embodiment of the present invention, the child safety seat connection (20) is such that the conduit leads to a non-critical fuse such as a rear-window wiper or non-critical plug or outlet. In this manner, the child safety seat (10) will be in communication and receive power with the vehicle through the vehicle internal wiring via the conduit that carries power and information between the child safety seat (10) at its child safety seat connection (20) and the internal wiring of the vehicle. In an additional embodiment, the child safety seat connection (20) is a conventional wireless receiver and/or transmitter that communicates with a receiver and/or transmitter associated with the computer system of the vehicle.

The child safety seat (10) can be engaged when an engagement mechanism (30) is activated. The engagement occurs when the child safety seat (10) is connected to the internal wiring or computer system of the vehicle. The engagement mechanism (30) is essentially activated when a child is placed into the child safety seat (10). For example, once the harness or locking-in aspect of the child safety seat (10) is implemented, a signal will pass through the wired or wireless conduit to the vehicle internal wiring and/or computer system. In this manner, when the engagement mechanism (30) is activated, the vehicle will respond with an alert once the ignition is powered off. Conversely, when the engagement mechanism (30) is deactivated while the child safety seat connection (20) is in communication with the vehicle, the alert will not occur. The engagement mechanism (30) is deactivated when the child is removed from the child safety seat (10) or the harness, latch, bar, or any other securing element of the child safety seat (10) is disconnected or removed.

When the child safety seat (10) is engaged via the engagement mechanism (30), this indicates to the vehicle through the conduit that a child is restrained or secured. Once the engagement mechanism (30) is activated and the ignition is on the "off" position, a repeating audible alert is triggered. This alert is an audible signal being transmitted or emitted through the speakers of the vehicle, in addition to a flashing dashboard light.

Figure 2:
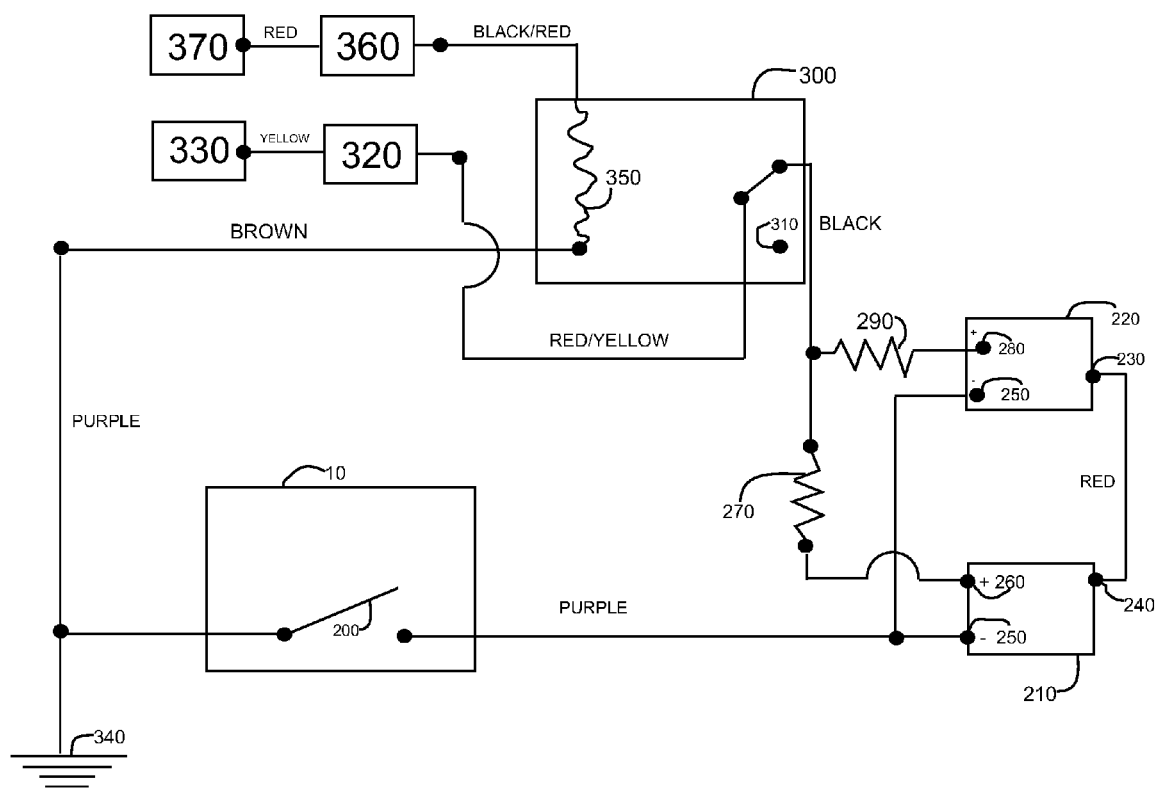
FIG. 2 is a view of the circuit connection of an embodiment of the present invention.

FIG. 2 is a view of the present invention that demonstrates an example of the circuit connection between the child safety seat connection (20) and the internal wiring and ultimately the speakers and dashboard of the vehicle. As we see in this embodiment, the child safety seat (10) is electronically connected to the internal wiring and speaker system of the vehicle. The switch (200) in this view is closed when the child safety seat (10) is secured, meaning that the engagement mechanism (30) has been latched, secured or otherwise harnessed. The switch (200) is open when the child safety seat (10) is not in use and the engagement mechanism (30) is not secured, latched or otherwise harnessed. A conduit between the child safety seat connection (20) and the internal wiring of the vehicle, which in FIG. 2 is a purple connection, allows the conventional electronic signal to travel through the vehicle. A purple connection is made between the speaker (210) of the vehicle and the child safety seat (10). This connection also leads to the actual audio player (220) of the vehicle. The audio player (220) can be any conventional media-playing device that is incorporated into the vehicle so that sound is emitted from the audio player (220) to the speaker (210). A red connection also links the S.P. OUT (230) and the S.P. IN (240) of the audio player (220) and the speaker (210) respectively.

The purple connection runs from the child safety seat (10) to the negative ends (250) of the speaker (210) and the audio player (220). The positive end of the speaker (210) connects a black connection through a 70-ohm resistor (270) while the positive end (280) of the audio player (220) runs through a 50-ohm resistor (290). The black connection then passes through a normally open relay (300). The connection then meets a red/yellow wire connection and passes to a 7.5 AMP fuse (320), through a yellow connection and into a 30 AMP fuse (330). Meanwhile, the purple connection from the child safety seat (10) passes to a light (340) and also to a brown connection and into an inductor (350). From there, a black/red connection passes through a 5.0 AMP fuse (360) and a red connection passes to a 15 AMP fuse (370).

In the preferred embodiment, the 30 AMP fuse (330) and the 15 AMP fuse (370) are used to provide power to the present invention. It should be noted that the 30 AMP fuse (330) has power all the time while the 15 AMP fuse (370) has power only when the vehicle ignition is on. The 5.0 AMP fuse (360) and the 7.5 AMP fuse (320) are used to protect the circuits. When the vehicle ignition is turned off, the normally open relay (300) will switch to a closed relay (310), which completes the circuit to the audio player (220). If the child safety seat engagement (30) is engaged, a recorded or unrecorded audio message or alert will be emitted to alert the driver that a child is in the child safety seat (10).

Figure 3:
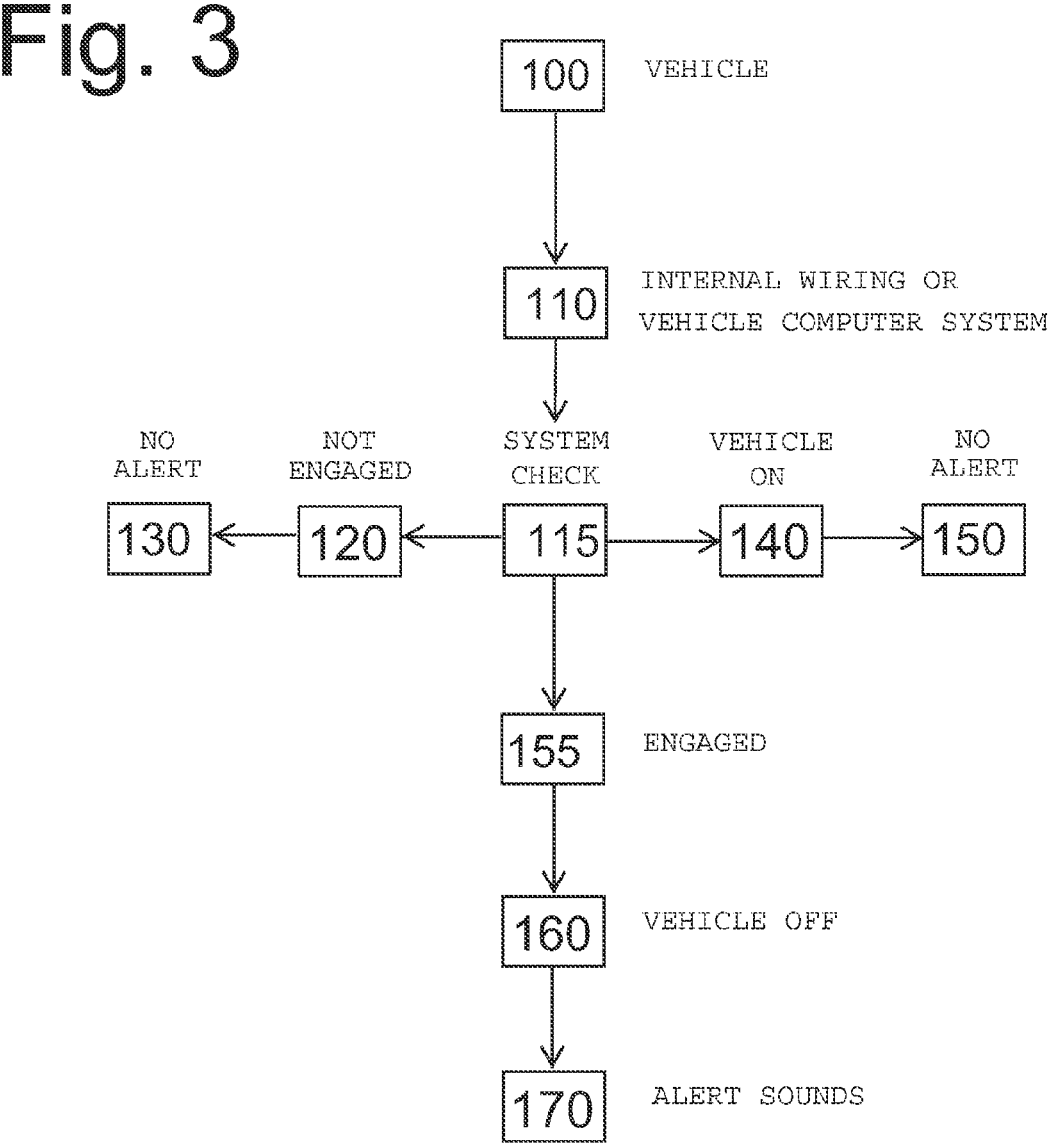
FIG. 3 is a flow chart of alarm activation settings of the present invention.

FIG. 3 is a flow chart of the process of the present invention. What happens is that the child safety seat (10) is placed into the vehicle (100) either by professional installation, factory installation or via individual placement. The child safety seat (10) is then connected to the vehicle (110) internal wiring or vehicle computer system through the child safety seat connection (20) via wired conduit or wireless means. A system check commences (115) that ensures that the physical attributes of the present invention is functioning properly. The system check is further demonstrated in Table A below.

As we see in FIG. 3, the child safety seat (10) is not engaged (120) via the engagement mechanism (30). When the child safety seat (10) is not engaged (120), there is no alert (130) from the vehicle. In addition, if the vehicle ignition is turned on (140), there also is no alert (150). But after the child safety seat (10) is engaged (155) and the vehicle ignition is turned off (160), the alert from the vehicle will be sounded or emitted (170).

As mentioned above, in addition to the audible alert, a visual alert also will occur via conventional means at the same time in the preferred embodiment. This visual alert will blink, flash or otherwise be bright or noticeable enough for the driver to see. As FIG. 3 indicates, the visual alert also is directly connected with the child safety seat (10) and the internal wiring of the vehicle. The visual alert also is helpful for hearing impaired drivers. The visual alert in the preferred embodiment will appear on the dashboard of the vehicle. It is envisioned that a designated bulb or conventional image display with its own designated fuse will serve to display the visual alert. However, the preferred embodiment is to connect the present invention in the manner described above to an existing fuse and visual display.

An additional embodiment of the present invention relates to also sending an alert to a designated mobile phone, email address or text message. In this embodiment, much of the present invention operates as described above in either its wired or wireless embodiments. A signal from the child safety seat (10) via conventional transmitter will be emitted when the engagement mechanism (30) is activated and the vehicle ignition is turned off. The conventional transmission element can be programmed to transmit the signal to a designated receiving outlet that will ultimately reach an email, mobile phone, phone number or text. In addition, it is envisioned that this transmission from the child safety seat (10) under the above conditions can be on a timed or delay status. This means that the transmission will not be sent until some designated time such as five minutes and no less than a minute after the vehicle ignition is turned off while the engagement mechanism (30) is activated. This is to allow the driver ample time to turn off the ignition and remove the child from the child safety seat, but not too much time. The mobile signal alert embodiment is displayed in Table A.

TABLE A

| Child Safety Seat | Ignition Key Position | Vehicle Mode Parameter | Engine Running | Mobile Signal Alert |
|---|---|---|---|---|
| Engaged/Locked | OFF | Off | No | Sent (delayed or no delay) |
| Engaged/Locked | ACC | Accessory | No | Not Sent |
| Engaged/Locked | ON | Running | Yes | Not Sent |
| Not Engaged/Unlocked | OFF | Off | No | Not Sent |
| Not Engaged/Unlocked | ACC | Accessory | No | Not Sent |
| Not Engaged/Unlocked | ON | Running | Yes | Not Sent |

Table B is presented to demonstrate the alert activation setting of the preferred embodiment. The system check is such that all relevant components and connections of the present invention are operational in an automatic manner. The system check occurs at the time a child is placed in the child safety seat (10) with the engagement mechanism (30) activated. The engagement mechanism (30) in the preferred embodiment is when the seat/harness is activated in a locked or closed position. The system check begins when the engagement mechanism (30) is activated but before the ignition is started. The actual hardware connection between the child safety seat (10) and the internal wiring or wireless communication with the vehicle is conventional.

Once the system check begins, the audio alert will begin. This means that the time between activation of the engagement mechanism (30) and the ignition being turned on will result in an alert through the vehicle speaker (210). If the alert is not heard before the vehicle is started but after the engagement mechanism (30) is activated, then a fuse, resistor, battery, child safety seat connection (20) or some other wiring harness is bad or failing. In other practical terms, a driver will be used to hearing the alert between activated the engagement mechanism (30) and ignition of the vehicle. But the quiet from a bad element of the present invention is much more likely to attract the attention of the driver due to the fact that a driver will have become accustomed to hearing such a system check alert.

TABLE B

| Child Safety Seat | Ignition Key Position | Vehicle Power Mode Parameter | Engine Running | Elapsed Time - Alarm Reminder |
|---|---|---|---|---|
| Engaged/Locked | OFF | Off | No | Immediate |
| Engaged/Locked | ACC | Accessory | No | N/A |
| Engaged/Locked | ON | Running | Yes | N/A |
| Not Engaged/Unlocked | OFF | Off | No | N/A |
| Not Engaged/Unlocked | ACC | Accessory | No | N/A |
| Not Engaged/Unlocked | ON | Running | Yes | N/A |

I claim:

1. A system for child safety, comprising:

incorporating a child safety seat connection into a child safety seat, the child safety seat connection configured to serve as an entry point for communication between the child safety seat and a vehicle;

activating an engagement mechanism upon securing a child into the child safety seat;

transmitting a signal from the child safety seat via the child safety seat connection to the vehicle;

responding to the activation of the engagement mechanism with an audio and visual alert once ignition of the vehicle is powered off;

emitting the audible alert through the speaker of the vehicle, the speaker in communication with internal wiring of the vehicle and the internal wiring of the vehicle being in communication with the child safety seat via the child safety seat connection;

providing power to the child safety seat via a conduit attached to the internal wiring of the vehicle and the child safety seat connection;

providing a signal to and from the child safety seat via a conduit attached to the internal wiring of the vehicle and the child safety seat connection;

providing a signal to and from the child safety seat via a wireless connection, the wireless connection being received and transmitted via an internal computer system of the vehicle that is in communication with the internal wiring of the vehicle, and the child safety seat connection;

connecting the child safety seat via a conduit to the internal wiring and speaker system of the vehicle;

closing a switch between the internal wiring of the vehicle and the child safety seat when the child safety seat is secured via the engagement mechanism;

opening a switch between the internal wiring of the vehicle and the child safety seat when the child safety seat is not secured via the engagement mechanism;

connecting the child safety seat via the child safety seat connection to at least one fuse contained in the vehicle;

connecting the child safety seat via the child safety seat connection to at least one outlet contained in the vehicle;

connecting the at least one fuse with the audio player of the vehicle, the audio player connected to the speaker;

connecting the at least one outlet with the audio player of the vehicle, the audio player connected to the speaker;

emitting sound from the speaker when the vehicle is switched off and the engagement mechanism is activated;

emitting sound from the speaker when the vehicle is switched off and the engagement mechanism is activated;

running a system check at the time the engagement mechanism is activated but before ignition of the vehicle is started;

emitting an alert at the time the engagement mechanism is activated but before ignition of the vehicle is started; and emitting an alert at the time the engagement mechanism is activated but before ignition of the vehicle is started when physical components are functioning properly.

2. The system for child safety of claim 1, further comprising emitting the visual alert when ignition of the vehicle is turned off and the engagement mechanism is activated.

3. The system for child safety of claim 1, further comprising transmitting a signal from the child safety seat to a message receiving device no less than one minute after ignition of the vehicle is turned off and the engagement mechanism is activated.

* * * * *